United States Patent [19]

Weinwurm et al.

[11] Patent Number: 5,346,674

[45] Date of Patent: Sep. 13, 1994

[54] PROCESS AND APPARATUS FOR REMOVAL OF IMPURITIES FROM FLUE GASES

[75] Inventors: Peter Weinwurm; Paul S. Weinwurm, both of Brampton, Canada

[73] Assignee: Agglo Recovery, Rexdale, Canada

[21] Appl. No.: 861,884

[22] PCT Filed: Dec. 21, 1990

[86] PCT No.: PCT/CA90/00463

§ 371 Date: Jun. 22, 1992

§ 102(e) Date: Jun. 22, 1992

[87] PCT Pub. No.: WO91/09664

PCT Pub. Date: Jul. 11, 1991

[51] Int. Cl.$^5$ ............................................. B01D 53/02
[52] U.S. Cl. ........................... 422/168; 34/74; 34/75; 34/80; 62/17; 62/544; 423/210
[58] Field of Search ............... 422/168; 423/210, 230, 423/234, 239, 240 S, 244.02, 244.04, 244.11, 247, 215.5; 34/74, 75, 80; 62/17, 544

[56] References Cited

U.S. PATENT DOCUMENTS

| | | |
|---|---|---|
| 4,281,518 | 8/1981 | Müller et al. . |
| 4,424,680 | 1/1984 | Rothchild . |
| 4,668,489 | 5/1987 | Alexander et al. ................. 423/230 |
| 4,744,964 | 5/1988 | Kuhl ..................................... 423/230 |
| 4,982,512 | 1/1991 | McClenny ............................. 34/80 |
| 5,100,643 | 3/1992 | Brna et al. ........................ 423/240 S |
| 5,118,480 | 6/1992 | Cook et al. ........................... 423/230 |

FOREIGN PATENT DOCUMENTS

| | | |
|---|---|---|
| 0208146 | 1/1987 | European Pat. Off. . |
| 0357160 | 3/1990 | European Pat. Off. . |
| 2902391 | 7/1980 | Fed. Rep. of Germany . |
| 2082086 | 3/1982 | United Kingdom . |

Primary Examiner—Timothy M. McMahon
Attorney, Agent, or Firm—Stevens, Davis, Miller & Mosher

[57] ABSTRACT

A process and apparatus is disclosed for removing impurities from gases such as flue gases. A liquified gas such as nitrogen is introduced into direct contact with the gases to be cleaned of impurities concurrent with the introduction of a sorbent powder for cooling the gas to a temperature in the range of 60° C. to −20° C. and with nucleation precipitation and condensation of heavy metals, salts, acids and hydrocarbons onto the sorbent. A porous and permeable bed of said sorbent is formed through which the gases are drawn for absorption and adsorption of said precipitated and condensed material thereon. The pH of the sorbent is adjusted and maintained in the pH range of 9 to 11.

13 Claims, 2 Drawing Sheets

PROCESS AND APPARATUS FOR REMOVAL OF IMPURITIES FROM FLUE GASES

FIELD OF THE INVENTION

This invention relates to a process and apparatus for removing impurities from flue gases and, more particularly, relates to a process and apparatus for removing gaseous and solid pollutants in flue gases such as emissions from thermochemical and the like reactions.

BACKGROUND OF THE INVENTION

Gaseous emissions from many thermochemical processes involve the emission of a number of pollutants ranging from heavy metal vapours (Hg, Cd, Pb and Zn), salt vapours (NaCl, KCl, KF, and NaF), acid gases (HF, HCl and $SO_2$), organic compounds (dioxins, furans, hydrocarbons and solvents) as well as submicron particle emissions. The imposition of increasingly stringent environmental regulations to control these emissions has resulted in air pollution control devices becoming an integral component of thermochemical processes.

Typical attempts at reducing these pollutants include dry, wet and semi-dry scrubbing systems followed by particle removal in a baghouse or electrostatic precipitator. Wet scrubbing, by water spraying alone, is usually sufficient for control of HCl and HF emissions. For effective removal of $SO_2$, sorbents are used. U.S. Pat. No. 4,704,972 discloses a method and apparatus for removing dust and water-soluble acid pollutants contained in smoke from the incineration of garbage wherein dust is removed from the smoke and the smoke is cooled by a heat exchanger below the dew point of gases therein whereby condensed water vapour traps acid pollutants for neutralization. The lowering of the temperature of saturated flue gas to below the dew point of acid pollutants does permit substantial condensation of said gases. However, low temperature emission control systems control systems suffer from a number of operational difficulties such as build up of insoluble salts on the walls of the vessel (scaling), corrosion and fouling of the vessel internals, difficulties in sedimentation of the produced salts, and clarification and recycling of vessel residue.

U.S. Pat. No. 4,281,518 (De-A-2902391) discloses the separation of certain components of a gas mixture therefrom by cooling the gas mixture by the addition of a liquid or cold inert gas to cause those components to go into a liquid or solid state. The condensed or precipitated components are collected and heated to form a liquid suitable for removal. This reference does not disclose contacting the gases with a powdered sorbent during cooling and adding an alkali metal to the sorbent to adjust the pH to about 9 to 11 for pH control.

It will be understood that the term "heavy metals" used in the specification and claims will include the metals, cadmium, lead, zinc, arsenic, antimony and selenium.

SUMMARY OF THE INVENTION

It has been found that the cooling of flue gases by the introduction of a liquified gas into direct contact with the flue gases for cooling of the flue gases to a temperature in the range of 60° C. to −20° C., the concurrent introduction of a powdered sorbent into said gases for nucleation and for the condensation or precipitation of heavy metals, salts, acids and hydrocarbons thereon, and the concurrent formation of a porous and permeable filter bed of said sorbents in which the pH of the sorbents is maintained in the range of about 9 to 11 for absorption and adsorption of said condensed or precipitated heavy metals, salts, acids, hydrocarbons and solid pollutants thereon as the flue gases are drawn therethrough, effectively removes impurities from the gases.

Measurement of the pressure drop of gases passing through the filter bed and scraping of the filter bed to reduce its thickness as the pressure drop exceeds a predetermined value, with recycle of sorbent until it is saturated with impurities, allows maintenance of an effective porous and permeable filter bed.

In its broad aspect, the process of the invention relates to the removal of at least one gaseous impurity selected from heavy metals, alkali salts, acids, hydrocarbons and submicron particle emissions contained in gases such as flue gases and comprises the steps of cooling the gases by means of a liquified gas selected from nitrogen and air to a temperature in the range of 60° C. to −20° C. to condense or precipitate said at least one impurity of said contained impurities, contacting the gases during cooling of the gases with a sorbent selected from diatomaceous earth, perlite, expanded vermiculite, expanded sodium/calcium glass, expanded clay, and zeolites, said sorbent having a surface area between 30 m2/g to 600 m2/g and a pore volume between 0.3 and 1.0 cc/g to collect said impurity, and adding an effective amount of an alkali metal to said sorbent to adjust the pH of the sorbent to about 9 to 11. Said sorbent preferably is recycled until the sorbent is substantially saturated with said at least one impurity.

More particularly, the process of the invention relates to the removal of gases of heavy metals, alkali salts, acids, hydrocarbon compounds and well as submicron particle emissions from flue gases which comprises the steps of cooling said flue gases to below 100° C., preferably about 80° C., further cooling said gases to a temperature in the range of about 60° C. to −20° C. by contacting said gases with a liquified gas to precipitate heavy metals and salts and to condense hydrocarbons, water and acids, contacting said gases in a filter chamber during cooling of the flue gases with a sorbent selected from diatomaceous earth, perlite, expanded vermiculite, expanded sodium/calcium glass, expanded clay, and zeolites and which has high absorption, good gas filtration characteristics, a surface area between 30 m2/g to 600 m2/g and a pore volume between 0.3 and 1.0 cc/g, to absorb and adsorb precipitated metals and salts, and condensed hydrocarbons and acids, and solid submicron particles and to remove them from said gases, adding alkali metal to said sorbent to adjust the pH to the range at about 9 to 11, recycling said sorbent to said flue gases until said pore volume is substantially saturated, and discharging saturated sorbent.

The gases are contacted with the sorbent as a particulate solid introduced into the gases in the filter chamber and contacted with the sorbent formed into a porous and permeable filter bed through which the gases are drawn during discharge of the gases from the filter chamber.

The gas discharge from the filter chamber can be selectively separated of nitrogen and carbon dioxide and residual gas rich in oxygen can be recycled for use in a thermochemical or chemical process.

The flue gas preferably is pre-cooled from a normal flue gas temperature of about 500° to 700° C. down to about 200° to 350° C. in a heat exchanger, down to below 100° C., preferably to about 80° C. in a primary condenser, and to less than 60° .C, preferably to about 10° C., in a secondary condenser in order to reduce consumption of the liquified gas coolant such as liquid nitrogen in the subsequent sub-cooling stage. The heat exchanger and primary condenser can employ an indirect cooling medium such as water or air rather than a liquified gas such as liquid nitrogen, if desired, and cooling in the secondary condenser can be accomplished by direct contact with the cooling medium such as liquid nitrogen.

The sub-cooling process is a low temperature flue gas treatment system that uses a sorbent and a liquified gas for removing condensate and solid emissions. After pre-cooling, the flue gas is introduced at the top of a sub-cooling vessel into a filter chamber through a gas disperser. The sorbent is injected into the flue gas in the filter chamber by an air tight feeder and dispersed by means of an sorbent disperser. Flue gas with sorbent dispersed therein is cooled by direct contact with a liquified gas which functions as a cooling medium and which is injected into the filter chamber through a liquid diffuser. The temperature of the flue gas is thus reduced to and regulated at a desirable temperature in the range of +60° to −20° C., preferably to about −2° C. Retention time of flue gas in the chamber is regulated between 2.5 and 5 seconds.

An alkali metal is added to the sorbent before or at the filter chamber in an amount effective to adjust the pH of the sorbent to the range of 9 to 11. The alkali metal can be particulate NaOH, Ca(OH)$_2$ or KOH, Ca(OH)$_2$ being preferred in order to form calcium salts for reuse in the thermoreactor.

The flue gas is filtered through a sorbent collector plate having a filter cloth covered with a layer of sorbent regulated as to its thickness as the gas is discharged from the sub-cooling filter chamber. The sub-cooling step is very effective for removing residual impurities. Water saturation, acid saturation, and precipitation of heavy metal and salt vapours onto the active surfaces of the sorbent, as well as the filtration and removal of the residual fine solid pollutant particles such as dust are effectively achieved.

The functions of the sorbent are:

a) to capture and agglomerate any droplets of acids, precipitating salts and heavy metals;

b) to create an active nucleus for precipitation and condensation of salts, acids, organic compounds and heavy metals;

c) to absorb or adsorb condensed water, acids and hydrocarbons; and d) to filter residual fine particles by collection on a porous and permeable layer of sorbent which functions as a filter matrix.

The sorbent is selected from diatomaceous earth, perlite, expanded vermiculite, expanded sodium/calcium glass, expanded clay, and zeolite which have high absorption and air filtration characteristics, a surface area between 30 m2/g-600 m2/g and a pore volume between 0.3 and 1.0 cc/g, said sorbent preferably containing an effective alkali metal component to maintain a pH of about 9 to 11 to neutralize and to absorb precipitated acids, salts, water, hydrocarbons, heavy metals and particle dust.

The sorbent is recycled until its efficiency is exhausted and the sorbent saturated with impurities is subsequently removed from the process and replaced with fresh sorbent.

The apparatus of the invention includes a filter vessel having a filter chamber into which the flue gases, liquified cooling gas, powdered sorbent and alkali are fed. The sorbent accumulates as a porous and permeable filter layer or bed on a collector plate and the pressure drop of gas flowing through the filter bed is monitored. A pressure drop in the range of 2.5–17.8 cm of water is desired and, as the sorbent bed thickness or saturation by collected impurities increases to impede gas flow such that the pressure drop exceeds 17.8 cm of water, a scraper is actuated to remove a layer of sorbent which is recycled to the filter chamber until the sorbent is saturated. It is preferred that the scraper be adjustable in height such that a different depth of sorbent bed be provided after each scraping in order to present a fresh bed surface.

BRIEF DESCRIPTION OF THE DRAWINGS

The process and apparatus of the invention will now be described with reference to the accompanying drawinqs, in which:

FIG. 1 is a schematic illustration of an embodiment of the process of the present invention; and.

DESCRIPTION OF THE PREFERRED EMBODIMENT

Figure 1:
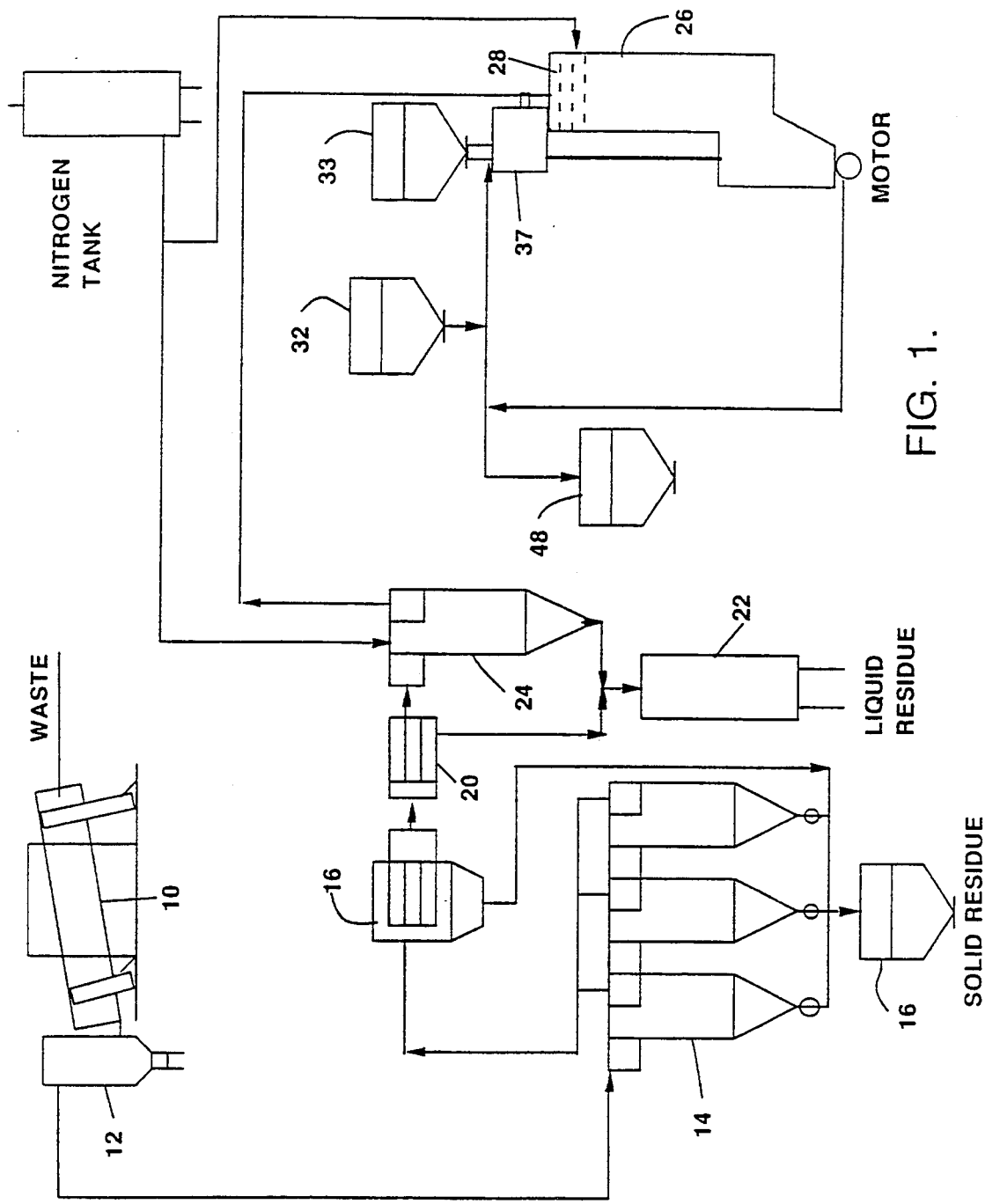

With reference to the system shown in FIG. 1, an embodiment of the system and process of the present invention integrated with a thermoreactor for treating hazardous or toxic wastes is described for illustration purposes. Waste materials such as inorganic wastes including electroplatting sludges, heavy metal sludges, sludges containing heavy metals, and the like are mixed with a plastic material capable of forming a plastic mixture which can be shaped into articles such as granules with large surface area by extrusion or granulation, as disclosed in co-pending U.S. patent application Ser. No. 299,979 now U.S. Pat. No. 5,087,735, incorporated herein by reference.

The resulting mixture is shaped into granules by means of an extruder or granulator apparatus, said granules ranging in size from 0.3 to 25 mm in diameter, and dried to reduce the moisture of the granules to less than 2% by weight water. Water vapour and hydrocarbon gases are condensed and separated to recover a hydrocarbon product.

Substantially dried granules are fed to thermochemical reactor 10 which is an indirectly heated, gas-tight vessel with a controlled oxidizing, neutral or reducing atmosphere as desired, and heated up to about 1000° C. under a partial vacuum relative to atmospheric pressure of at least 2.5 cm of water, preferably within the range of 2.5 to 7.6 cm of water.

A solid aggregate product discharged from reactor 10 into hopper 12 is essentially insoluble and can be used as an aggregate in the manufacture of concrete products.

The gaseous product from reactor 10 is passed to a battery of cyclones 14 in series in which the gas temperature is reduced to about 130° C. in stages of 210° C., 180° C. and 130° C. The apex discharge from the cyclones is fed to hopper 16 and constitutes solid residues of heavy metal salts. The vortex discharge is fed to a bag filter 18 wherein collected solids are discharged to hopper 16 and the gas is fed to primary condensor 20 which is indirectly cooled by a fluid or liquid such as water to reduce the gas temperature to less than 100° C., preferably to about 80° C.

Although the description of the process of the invention is proceeding with reference to gaseous emissions from a high temperature reactor, the process has utility in removing impurities from flue gases which may contain hydrocarbon and water vapours and reference to the precipitation and separation of hydrocarbons and water will be included.

Condensed hydrocarbons together with water and heavy metals such as mercury are collected in liquid residue tank 22 and the gas is passed to a secondary condenser such as a cyclone 24 for contact with a liquified gas such as nitrogen which reduces the gas temperature to a temperature less than 60° C., preferably about 10° C. The apex discharge from the cyclone 24, such as water and hydrocarbons, is fed to liquid residue tank 22 and the vortex discharge is fed to vessel 26.

Figure 2:
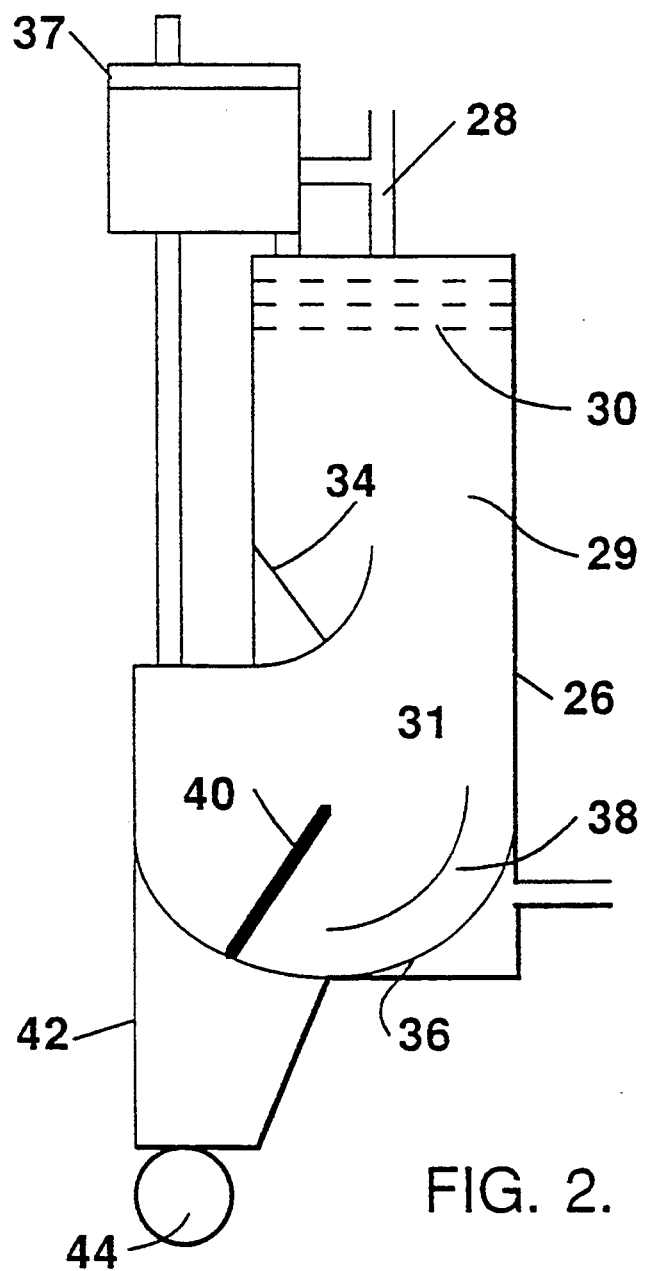
FIG. 2 is a side elevation of an embodiment of apparatus of the present invention.

The gas from cyclone 24 is fed to gas inlet 28 of vessel 26 together with liquid nitrogen onto diffuser plates 30 for intimate mixing of the gas with the liquid nitrogen which immediately evaporates to effectively cool the gas to a temperature below 60° C., preferably $-2°$ C., a volumetric feeder 37 feeds a sorbent from hopper 32 together with a caustic from hopper 33 onto diffuser plate 30 for mixing with the gas in chamber 29 which forms the upper part of filter chamber 31. A flow adjustor 34 can be pivoted as indicated in FIG. 2 to control the rate of flow of gases, particulates and condensate droplets within vessel 26.

The presence of a sorbent powder in the gas as the gas cools in filter chamber 31 is believed to enhance precipitation of metals and salt and condensation of hydrocarbons and acids by nucleation and agglomeration. The sorbent absorbs or adsorbs the precipitates including condensates during mixing.

Precipitated metals and salts and condensed hydrocarbons and acids, with residual solids, absorbed or adsorbed by the sorbent are deposited onto filter collector plate 36 at the base of vessel 26. The sorbent with adhered and absorbed material increases in thickness to function as an effective filter bed 38 further collect liquids and solids while maintaining good filtration characteristics.

The pressure drop across filter bed 38 deposited on filter collector plate 36 is monitored, it being desirable that a pressure differential of not more than 17.8 cm of water, preferably between 2.5 to 17.8 cm of water, be maintained across bed 38 while maintaining a partial vacuum in vessel 10 of at least 2.5 cm of water relative to atmospheric pressure. Upon the pressure differential across filter bed 38 being increased up to about 17.8 cm of water or the pressure in vessel 40 being reduced to about 2.5 cm of water, scraper 40 is actuated to scrape a portion of the upper surface of filter bed 38 into hopper 42 from which it is removed by means of a flexauger with motor depicted by numeral 44.

The sorbent scraped from filter bed 38 is recycled to vessel 26 or, if saturated with solids and liquids, is fed to thermoreactor 10 or to hopper 48.

The gas product from unit 26 is subjected to selective separation to recover nitrogen and to remove carbon dioxide, residual gases being recycled to vessel 10.

The process of the invention will now be described with reference to the following non-limitative example. Process gas equivalent to flue gases at a temperature of 300° C. was fed into a vessel 26 at a flow rate of about 50 m$^3$/hr together with a sorbent powder comprised of diatomaceous earth fed at a rate of 20 kg/hr. Powdered calcium hydroxide was fed at a rate of 1 kg/hr with the sorbent by means of a volumetric feeder to establish a sorbent pH of about 9.5 at a bed of sorbent formed on a filter plate at the base of the vessel through which flow gases were drawn by the suction of an exhaust fan.

The compositions of the gas feed and exhaust gas are shown in the following Table.

Test #1 conducted at 10° C. and Test #2 conducted at $-2°$ C. The effective percent removal of heavy metals, mercury vapour, acid gases and hydrocarbons is shown in the Table.

TABLE

| ELEMENT COMPOUND | TEST #1 | | | TEST #2 | | |
|---|---|---|---|---|---|---|
| | INLET | OUTLET | REMOVAL % | INLET | OUTLET | REMOVAL % |
| PARTICULATES | | | | | | |
| Cadmium | 0.52 | <0.01 | >99.3 | 0.41 | <0.01 | >98.1 |
| Lead | 4.91 | <0.02 | >99.7 | 5.54 | 0.03 | 99.4 |
| Zinc | 191.00 | <0.02 | 100 | 192.00 | 0.51 | 99.7 |
| Arsenic | 0.07 | <0.02 | >74.6 | 0.04 | <0.02 | >60.2 |
| Antimony | <0.005 | <0.003 | 30.3 | 0.007 | <0.003 | >53.5 |
| Selenium | <0.02 | <0.02 | 30.3 | 0.02 | <0.02 | 30.3 |
| Mercury | <0.02 | >0.02 | 30.3 | <0.02 | <0.02 | 30.3 |
| MERCURY VAPOUR | 1.17 | N/A | N/A | 0.46 | 0.01 | 98.3 |
| Total ACID GASES | | | | | | |
| HCl | 8130.00 | 5.70 | 99.9 | 85700.00 | <9.20 | 99.9 |
| SO$_2$ | 484.00 | <0.47 | >99.9 | 582.00 | 0.50 | >99.9 |
| HF | 81.00 | <3.70 | >95.4 | 148.00 | 4.90 | >96.9 |
| NO | >2550.00 | 39.40 | >98.5 | >2640.00 | 7.80 | >99.7 |
| NO$_2$ | <6.60 | <6.60 | 0 | <6.60 | <6.60 | 0.0 |
| HYDROCARBONS Total | 84.00 | 9.70 | 88.5 | 366.00 | 10.00 | 97.3 |

The embodiments of the invention in which an exclusive property or privilege is claimed are defined as follows:

1. A process for substantially removing at least one gaseous impurity selected from gases of heavy metals, salts, acids and hydrocarbons and submicron particle emissions contained in gases which comprises the steps of:

cooling the gases by means of a liquified gas selected from nitrogen and air to a temperature in the range of 60° C. to −20° C. to precipitate said at least one impurity of said contained impurities;

contacting the gases during cooling of the gases with a powdered sorbent selected from diatomaceous earth, perlite, expanded vermiculite, expanded sodium/calcium glass, expanded clay, and zeolites which has a surface area between 30 m$^2$/g to 600 m$^2$/g and a pore volume between 0.3 and 1.0 cc/g to collect said impurity;

adding an alkali metal to said sorbent to adjust the pH of the sorbent to about 9 to 11;

forming a filter bed of said sorbent in a filter chamber and passing the cooled gases through said filter bed;

collecting said impurity by adsorbing and absorbing precipitated heavy metal and salts, condensed acids and hydrocarbons, and submicron emissions of the filter bed;

recycling said sorbent until the pore volume of the sorbent is substantially saturated with said at least one impurity; and discharging the saturated sorbent.

2. In a process as claimed in claim 1, forming a filter bed of said sorbent in a filter chamber and passing the cooled gases through said filter bed to collect said impurity.

3. In a process as claimed in claim 2, collecting said impurity by adsorbing and absorbing precipitated heavy metal and salts, condensed acids and hydrocarbons, and submicron emissions on the filter bed, recycling said sorbent until the pore volume of the sorbent is substantially saturated with said at least one impurity, and discharging the saturated sorbent.

4. In a process as claimed in claim 3, forming a filter bed continuously by accumulating a thickness of said sorbent, monitoring pressure drop across the filter bed, and removing a portion of the thickness of the filter bed when the pressure drop exceeds a predetermined value.

5. A process as claimed in claim 4, removing a portion of the filter bed by scraping the surface of the filter bed to reduce the filter bed thickness and to provide a fresh filter bed surface.

6. A process as claimed in claim 5, reducing the thickness of the filter bed when the pressure drop increases to 17.8 cm (7 inches) of water.

7. A process as claimed in claim 5 or 6, varying the thickness of the filter bed to continually provide a fresh filter bed surface.

8. A process as claimed in claim 1, pre-cooling the gases indirectly by use of a heat exchanger to a temperature below about 100° C.

9. A process as claimed in claim 6, varying the thickness of the filter bed to continually provide a fresh filter bed surface.

10. A process as claimed in claim 2, pre-cooling the gases indirectly by use of a heat exchanger to a temperature below about 100° C.

11. A process as claimed in claim 3, pre-cooling the gases indirectly by use of a heat exchanger to a temperature below about 100° C.

12. A process as claimed in claim 4, pre-cooling the gases indirectly by use of a heat exchanger to a temperature below about 100° C.

13. A process as claimed in claim 6, pre-cooling the gases indirectly by use of a heat exchanger to a temperature below about 100° C.

* * * * *